(12) United States Patent
Yuan

(10) Patent No.: US 11,222,327 B2
(45) Date of Patent: Jan. 11, 2022

(54) RESOURCE ALLOCATION METHOD AND DEVICE, AND ELECTRONIC PAYMENT METHOD

(71) Applicant: ADVANCED NEW TECHNOLOGIES CO., LTD., Grand Cayman (KY)

(72) Inventor: Leiming Yuan, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 295 days.

(21) Appl. No.: 16/417,894

(22) Filed: May 21, 2019

(65) Prior Publication Data

US 2019/0272530 A1 Sep. 5, 2019

Related U.S. Application Data

(63) Continuation of application No. PCT/CN2017/114421, filed on Dec. 4, 2017.

(30) Foreign Application Priority Data

Dec. 12, 2016 (CN) .......................... 201611140807.0

(51) Int. Cl.
*G06Q 20/32* (2012.01)
*G06K 19/06* (2006.01)
(Continued)

(52) U.S. Cl.
CPC ... *G06Q 20/3276* (2013.01); *G06K 19/06028* (2013.01); *G06K 19/06037* (2013.01);
(Continued)

(58) Field of Classification Search
CPC .... G06Q 40/00; G06Q 20/3276; G06Q 20/10; G06Q 20/385; G06Q 20/401
See application file for complete search history.

(56) References Cited

U.S. PATENT DOCUMENTS

| 7,530,068 B2 | 5/2009 | Clark et al. |
| 7,555,460 B1 | 6/2009 | Barkan |

(Continued)

FOREIGN PATENT DOCUMENTS

| CA | 3046710 A1 | 6/2018 |
| CN | 101334875 A | 12/2008 |

(Continued)

OTHER PUBLICATIONS

S. Karnouskos, "Mobile payment: A journey through existing procedures and standardization initiatives," in IEEE Communications Surveys & Tutorials, vol. 6, No. 4, pp. 44-66, Fourth Quarter 2004, doi: 10.1109/COMST.2004.5342298. (Year: 2004).*

(Continued)

*Primary Examiner* — Lalita M Hamilton

(57) ABSTRACT

Methods, systems, and apparatus, including computer programs encoded on computer storage media, for allocating resources are provided. One of the methods includes receiving a first request from a first client for accessing a server, wherein the first request includes token information corresponding to resource information of a second client; determining, according to the token information included in the first request, the resource information of the second client corresponding to the token information; receiving resource allocation information from the first client; and allocating resource according to the resource allocation information from the first client and the resource information of the second client.

15 Claims, 11 Drawing Sheets

Input application information for applying for a collection two-dimensional code Name
Collection bank account
Mobile phone number
Contact address
Member account After passing verification, map the input application information into a collection two-dimensional code and a corresponding URL The URL corresponding to the collection two-dimensional code contains a Token Collection two-dimensional code Save the collection two-dimensional code, the URL, and the collection bank account information, as well as the mapping relation between the information Two-dimension al code URL ⟷ (Token) ⟷ { Name, Collection bank account, Mobile phone number, Contact address, Member account }

(51) Int. Cl.
  *G06Q 20/10* (2012.01)
  *G06Q 20/38* (2012.01)
  *G06Q 20/40* (2012.01)
  *G06Q 20/36* (2012.01)
  *G06Q 20/06* (2012.01)

(52) U.S. Cl.
  CPC ......... *G06Q 20/0655* (2013.01); *G06Q 20/10* (2013.01); *G06Q 20/3674* (2013.01); *G06Q 20/3678* (2013.01); *G06Q 20/385* (2013.01); *G06Q 20/3821* (2013.01); *G06Q 20/401* (2013.01)

(56) References Cited

U.S. PATENT DOCUMENTS

| | | | |
|---|---|---|---|
| 8,180,941 | B2 | 5/2012 | Chen et al. |
| 8,306,036 | B1 | 11/2012 | Bollay |
| 8,490,102 | B2 | 7/2013 | Handlogten et al. |
| 8,929,217 | B2 | 1/2015 | Torres et al. |
| 10,049,360 | B2 | 8/2018 | Hammad |
| 10,373,158 | B1* | 8/2019 | James ............... G06Q 20/065 |
| 10,380,583 | B1* | 8/2019 | Ellis ................. G06Q 20/388 |
| 2006/0224470 | A1 | 10/2006 | Garcia Ruano et al. |
| 2008/0189186 | A1 | 8/2008 | Choi et al. |
| 2008/0189522 | A1 | 8/2008 | Meil et al. |
| 2009/0119159 | A1* | 5/2009 | Reardon ............ G06Q 20/202 705/40 |
| 2009/0240592 | A1* | 9/2009 | Baumgart ........... G06Q 20/347 705/17 |
| 2010/0146512 | A1 | 6/2010 | Chen et al. |
| 2012/0209749 | A1 | 8/2012 | Hammad et al. |
| 2012/0215700 | A1* | 8/2012 | Falk ................... G06Q 20/3276 705/67 |
| 2012/0316992 | A1 | 12/2012 | Oborne |
| 2013/0110727 | A1 | 5/2013 | Kobres |
| 2013/0262309 | A1 | 10/2013 | Gadotti |
| 2014/0067677 | A1* | 3/2014 | Ali ..................... G06Q 20/40 705/44 |
| 2014/0129428 | A1* | 5/2014 | Tyler .................. G06Q 30/06 705/39 |
| 2014/0149293 | A1 | 5/2014 | Laracey |
| 2014/0214671 | A1 | 7/2014 | Desilva et al. |
| 2015/0134537 | A1 | 5/2015 | Hammad |
| 2015/0332226 | A1 | 11/2015 | Wu et al. |
| 2016/0005022 | A1 | 1/2016 | Liberty et al. |
| 2016/0086151 | A1 | 3/2016 | Xia et al. |
| 2016/0155112 | A1 | 6/2016 | Phillips et al. |
| 2016/0162879 | A1 | 6/2016 | Mu |
| 2016/0203468 | A1 | 7/2016 | Chen |
| 2016/0210626 | A1 | 7/2016 | Ortiz et al. |
| 2016/0253651 | A1 | 9/2016 | Park et al. |
| 2018/0268398 | A1 | 9/2018 | Park et al. |

FOREIGN PATENT DOCUMENTS

| | | |
|---|---|---|
| CN | 101957959 A | 1/2011 |
| CN | 102376047 A | 3/2012 |
| CN | 102609861 A | 7/2012 |
| CN | 102968717 A | 3/2013 |
| CN | 103426084 A | 12/2013 |
| CN | 104766200 A | 7/2015 |
| CN | 204667463 U | 9/2015 |
| CN | 105099688 A | 11/2015 |
| CN | 105205664 A | 12/2015 |
| CN | 105701659 A | 6/2016 |
| CN | 105894263 A | 8/2016 |
| CN | 105989468 A | 10/2016 |
| CN | 107067240 A | 8/2017 |
| CN | 104702411 B | 12/2017 |
| JP | 2004-206402 A | 7/2004 |
| JP | 2007-108973 A | 4/2007 |
| JP | 4570450 B2 | 10/2010 |
| JP | 2011-210171 A | 10/2011 |
| JP | 2015-526774 A | 9/2015 |
| JP | 2016-510468 A | 4/2016 |
| JP | 2016-540292 A | 12/2016 |
| RU | 2381557 C2 | 2/2010 |
| TW | I537853 B | 6/2016 |
| TW | 201627927 A | 8/2016 |
| WO | 9927475 A1 | 6/1999 |
| WO | 2005/004069 A1 | 1/2005 |
| WO | 2014/153979 A1 | 10/2014 |
| WO | 2015/062480 A1 | 5/2015 |
| WO | 2015/175619 A1 | 11/2015 |
| WO | 2018107990 A1 | 6/2018 |

OTHER PUBLICATIONS

First Office Action for Chinese Application No. 201611140807.0, dated Jan. 3, 2020, (18 pages).
First Search Report for Chinese Application No. 201611140807.0, dated Dec. 27, 2019, (1 page).
Office Action for Australian Application No. 2017376038, dated Jan. 10, 2020, (5 pages).
Non-final rejection and Search Report for Taiwanese Application No. 106132578 dated Aug. 14, 2019 (8 pages).
Office Action for Japanese Application No. 2019-531254 dated Sep. 29, 2020.
Written Opinion for Singaporean Application No. 11201904919R dated Oct. 29, 2020.
Search Report for European Application No. 17881957.9 dated Apr. 20, 2020.
Office Action and Search Report for Russian Application No. 2019116028 dated Feb. 28, 2020.
Office Action for Korean Application No. 10-2019-7016766 dated May 19, 2020.
Office Action for Canadian Application No. 3046710 dated Jul. 3, 2020.
Second Examination Report for Australian Application No. 2017376038 dated Jul. 20, 2020.
Examination Report No. 4 for Australian Application No. 2017376038 dated Dec. 18, 2020.
Masterpass QR—Simply Scan to Pay [Viewed on internet on Dec. 16, 2020] Viewed on internet <URL https://www.youtube.com/watch?v=iuaLfj9AKpU >, Published on Oct. 24, 2016.
Written Opinion of the International Searching Authority and International Search Report for PCT Application No. PCT/CN2017/114421 dated Feb. 22, 2018 (15 pages).
International Preliminary Report on Patentability Chapter I for PCT Application No. PCT/CN2017/114421 dated Jun. 27, 2019 (12 pages).
Office Action and Search Report for Taiwanese Application No. 106132578 dated Feb. 21, 2019 (16 pages).
Office Action for Canadian Application No. 3046710 dated Apr. 22, 2021.

\* cited by examiner

S201

The first client sends a first request to a server for accessing the server so that the server determines, according to token information included in the first request, resource information of a second client corresponding to the token information, wherein the first request includes the token information corresponding to the resource information of the second client

S202

Resource allocation information is input and sent to the server for the server to complete resource allocation according to the resource allocation information input by the first client and the resource information of the second client

FIG. 2

FIG. 3A

RESOURCE ALLOCATION METHOD AND DEVICE, AND ELECTRONIC PAYMENT METHOD

CROSS REFERENCE TO RELATED APPLICATIONS

This application is a continuation application of International Application No. PCT/CN2017/114421, filed on Dec. 4, 2017, which claims priority to and benefits of Chinese Patent Application No. 201611140807.0 filed on Dec. 12, 2016. The contents of the above-referenced applications are incorporated herein by reference in their entirety.

TECHNICAL FIELD

This application relates to the field of computer technologies, in particular to a resource allocation method and device, and an electronic payment method.

BACKGROUND

With the development of Internet technology and the popularization of intelligent terminal equipment, greater convenience has been brought to people and resource allocation has become more and more common. In existing resource allocation methods, both parties of resource allocation often need to obtain a piece of the private information of the other party to realize resource allocation, thus posing a potential threat to the security of the privacy information of both parties of resource allocation.

For example, if the resource is funds and resource allocation is directed to fund transfer. Mobile payment has been widely used to realize such fund transfer. Existing mobile payment methods can be carried out by scanning a two-dimensional code for payment by a payee (fund receiver in a transfer process) or by scanning a two-dimensional code for collection by a payer (fund transferor in a transfer process). Compared with a traditional bank transfer method, the existing mobile payment methods do not require a party to inform the other party of the bank account information of the party for transfer, thus shielding a certain information for both the payee and the payer, and protecting the personal privacy of both parties to a certain extent.

However, the existing mobile payment methods still inform the payee or the payer of the registration information of the other party on a payment platform, which may include member account, real name, portrait photo, and mobile phone number. So for both sides of the transfer, there is still a risk of privacy breach. In situations such as sporadic transactions between strangers, the risk of privacy breach further increases.

SUMMARY

Embodiments of this application provide a resource allocation method and device for protecting the privacy information of both parties of resource allocation and ensuring the information security of resource allocation.

The embodiments of this application further provide an electronic payment method for protecting the privacy information of both parties of an electronic payment and ensuring the information security of fund transfer.

The embodiments of this application adopt the following technical solutions. In some embodiments, a resource allocation method is provided. A first request from a first client for accessing a server is received. The first request includes token information corresponding to resource information of a second client. According to the token information included in the first request, the resource information of the second client is determined corresponding to the token information. Resource allocation information from the first client is then received. Resource is allocated according to the resource allocation information received from the first client and the resource information of the second client.

In some embodiments, another resource allocation method is provided. A first client sends a first request to a server for accessing the server. The first request includes token information and enables the server to determine, according to token information, resource information of a second client corresponding to the token information. The token information corresponds to the resource information of the second client. Resource allocation information received from the first client is received and sent to the server for the server to allocate resource according to the resource allocation information and the resource information of the second client.

In some embodiments, a resource allocation device is provided. The resource allocation device includes a request receiving module configured to receive a first request from a first client for accessing a server. The first request includes token information corresponding to resource information of a second client. The resource allocation device further includes a resource information determining module configured to determine, according to the token information included in the first request, the resource information of the second client corresponding to the token information; an information receiving module configured to receive resource allocation information from the first client; and a resource allocation module configured to complete resource allocation according to the resource allocation information received from the first client and the resource information of the second client.

In some embodiments, an electronic payment method is provided. The method includes receiving a first request from a payment party for accessing a server. The first request includes token information corresponding to collection information of a collection party. The method further includes: determining, according to the token information included in the first request, the collection information of the collection party corresponding to the token information; receiving payment information from the payment party; and completing electronic payment from the payment party to the collection party according to the payment information received from the payment party and the collection information of the collection party.

In some embodiments, the first request from the payment party for accessing the server is from the first user after scanning identification code information of the collection party.

In some embodiments, the first request includes a uniform resource locator in one-to-one correspondence with the identification code information for accessing the server. The uniform resource locator includes token information for determining the collection information of the collection party.

In some embodiments, establishing correspondence between the token information and the collection information of the collection party includes generating a uniform resource locator including the token information and corresponding to the collection party, and determining the correspondence between the token information and the collection information of the collection party.

In some embodiments, generating the uniform resource locator to include the token information and corresponding to the collection party, and determining the correspondence between the token information and the collection information of the collection party includes: acquiring the collection information of the collection party; establishing a first correspondence between the collection information and the token information when the collection information is verified; generating the uniform resource locator to include the token information and corresponding identification code information; and storing the first correspondence between the collection information and the token information and a second correspondence between the token information and the uniform resource locator, and sending the identification code information to the collection party.

In some embodiments, determining, according to the token information included in the first request, the collection information of the collection party corresponding to the token information includes: extracting the token information included in the uniform resource locator corresponding to the first request; and determining, according to the token information, the collection information of the collection party which establishes the first correspondence with the token information at the server.

In some embodiments, the identification code information is a bar code and/or a two-dimensional code.

In some embodiments, the payment information received from the payment party includes payment account information of the payment party and electronic payment amount information. The collection information of the collection party includes identity information and collection account information of the collection party.

In some embodiments, the payment account information includes bank account information of the payment party and/or user registration account information of the payment party at the server; and the collection account information includes bank account information of the collection party and/or user registration account information of the collection party at the server.

In some embodiments, the server includes a platform server and at least one financial server. The platform server receives the first request from the payment party for accessing the platform server. The first request includes token information corresponding to the collection information of the collection party. The platform server determines, according to the token information included in the first request, the collection information of the collection party corresponding to the token information. The platform server receives the payment information from the payment party. The financial server completes electronic payment from the payment party to the collection party according to the payment information received from the payment party and the collection information of the collection party.

In some embodiments, after the platform server receives the payment information from the payment party, and before the financial server completes electronic payment from the payment party to the collection party according to the payment information received from the payment party and the collection information of the collection party, the method further includes the following operations. The platform server determines, according to the payment account information of the payment party, a financial server corresponding to the payment account information. The platform server sends a payment instruction to the financial server corresponding to the payment account information for the financial server to complete electronic payment from the payment party to the collection party.

In some embodiments, the payment instruction from the platform server to the financial server corresponding to the payment account information contains collection account information of the collection party and the payment account information of the payment party.

In some embodiments, another electronic payment method is provided. The method includes receiving a first request from a collection party for accessing a server. The first request includes token information corresponding to payment information of a payment party. The method further includes: determining, according to the token information included in the first request, the payment information of the payment party corresponding to the token information; receiving collection information from the collection party; and completing electronic payment from the payment party to the collection party according to the collection information received from the collection party and the payment information of the payment party.

In some embodiments, an apparatus is provided. The apparatus includes a processor and a memory coupled to the processor and configured with instructions executable by the processor. The processor is configured to execute the instructions to perform operations including receiving a first request from a first client for accessing a server. The first request includes token information corresponding to resource information of a second client. The operations further include: determining, according to the token information included in the first request, the resource information of the second client corresponding to the token information; receiving resource allocation information from the first client; and allocating resource according to the resource allocation information received from the first client and the resource information of the second client.

In some embodiments, a non-transitory computer-readable storage medium is provided. The non-transitory computer-readable storage medium is configured with instructions which, when executed by a processor, cause the processor to perform operations including receiving a first request from a first client for accessing a server. The first request includes token information corresponding to resource information of a second client. The operations further include: determining, according to the token information included in the first request, the resource information of the second client corresponding to the token information; receiving resource allocation information from the first client; and allocating resource according to the resource allocation information received from the first client and the resource information of the second client.

At least one technical solution provided by the embodiments of this application can achieve the following beneficial effects.

For example, the first client sends the first request for accessing the server to the server. The first request does not include the resource information of the second client, but includes the token information corresponding to the resource information of the second client. After receiving the first request including the token information, the server can determine the resource information of the second client corresponding to the token information by identifying the token information in the first request, so that the server can know which second client the first client wishes to allocate resources to. According to some embodiments, since the first client does not identify the resource information of the second client, and both the resource allocation information of the first client and the resource information of the second client are processed in the server, the first client and the second client can complete resource allocation without knowing the private information of the other party. Therefore, the privacy information of the first client and the second client is more effectively and comprehensively protected.

Both sides of resource allocation (i.e., the first client and the second client) during resource allocation can be embodied as a collection party and a payment party of an electronic payment to complete electronic payment from the payment party to the collection party, so the embodiments of this application are applicable to scenarios such as fund transfer, electronic payment, etc.

BRIEF DESCRIPTION OF THE DRAWINGS

The accompanying drawings set forth herein are used for providing a further understanding of this application and constitute a part of this application. Exemplary embodiments of this application and the description thereof are used for explaining this application, and does not constitute any improper limitation on this application. In the accompanying drawings:

FIG. 2 is a flow chart of an eighth resource allocation method according to one embodiment of this application;

FIG. 3A is a schematic diagram of an interface of a resource allocation method according to one embodiment of this application;

DETAILED DESCRIPTION OF EMBODIMENTS

To make the objectives, technical solutions, and advantages of this application clearer, the technical solutions of this application will be clearly and completely described below with reference to specific embodiments of this application and the accompanying drawings. Apparently, the described embodiments are only some embodiments rather than all the embodiments of this application. All other embodiments obtained by a person of ordinary skill in the art based on the embodiments of this application without creative efforts shall fall within the protection scope of this application.

The technical solution provided by various embodiments of this application will be described in detail below with reference to the accompanying drawings.

Embodiment 1

Figure 1A:
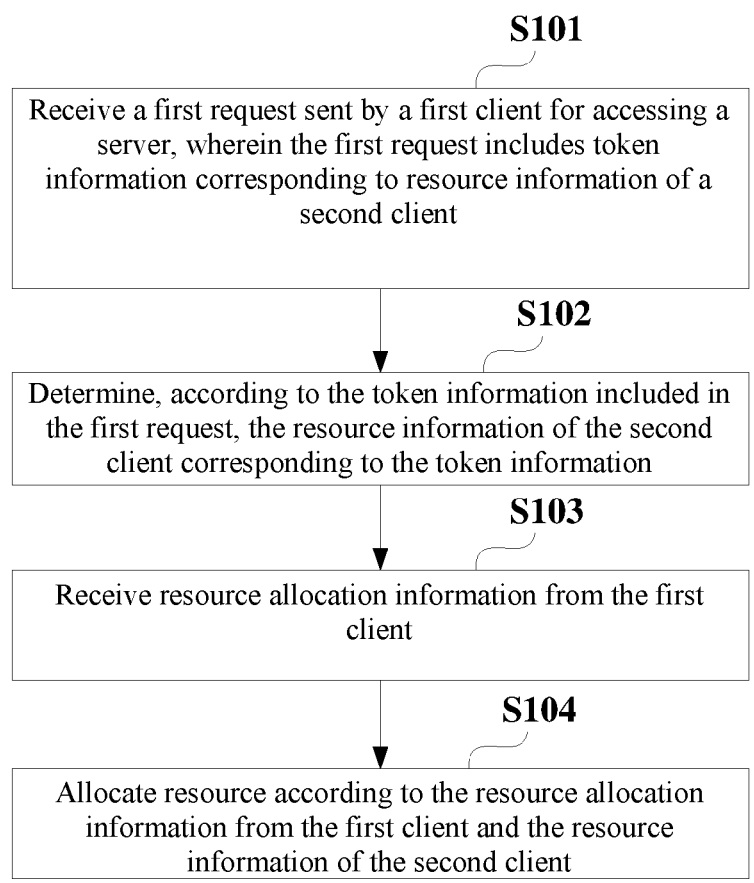
FIG. 1A is a flow chart of a first resource allocation method according to one embodiment of this application.

Referring to FIG. 1A, FIG. 1A shows a resource allocation method according to an embodiment of this application. The method is applicable to servers and includes one or more of the following operations.

At S101, a first request sent by a first client is received for accessing a server. The first request includes token information corresponding to resource information of a second client. It should be understood that a client as used in this specification may refer to a user, a hardware module and/or a software (application) module of a user, a user account, etc.

At S102, according to the token information included in the first request, the resource information of the second client corresponding to the token information is determined.

At S103, resource allocation information from the first client is received.

At S104, resource is allocated according to the resource allocation information received from the first client and the resource information of the second client.

In some embodiments, the first request sent by the first client for accessing the server may be sent by the first client after scanning identification code information (corresponding to the uniform resource locator of the second client) of the second client. In some embodiments, the first client sends the first request for accessing the server to the server after scanning the identification code information of the second client. The first request includes the token information which enables the server to determine the resource information of the second client, but does not include the resource information of the second client. After S101 (that is, receiving the first request), the server executes the step S102. That is, the server determines, according to the token information included in the first request, the resource information of the second client corresponding to the token information, so that the server can know which second client the first client wishes to allocate resources to. Further, after receiving the resource allocation information received from the first client at S103, the server can execute S104 to complete resource allocation.

According to the above embodiment, since the first client cannot identify the resource information of the second client through the identification code information of the second client, and both the resource allocation information of the first client and the resource information of the second client are processed in the server, the first client and the second client can complete resource allocation without knowing the private information of the other party. Therefore, the privacy information of the first client and the second client can be more effectively and comprehensively protected, and the technical purpose of this application can be achieved.

The implementation of the embodiments of this application will be described below in detail from various aspects.

Figure 1B:
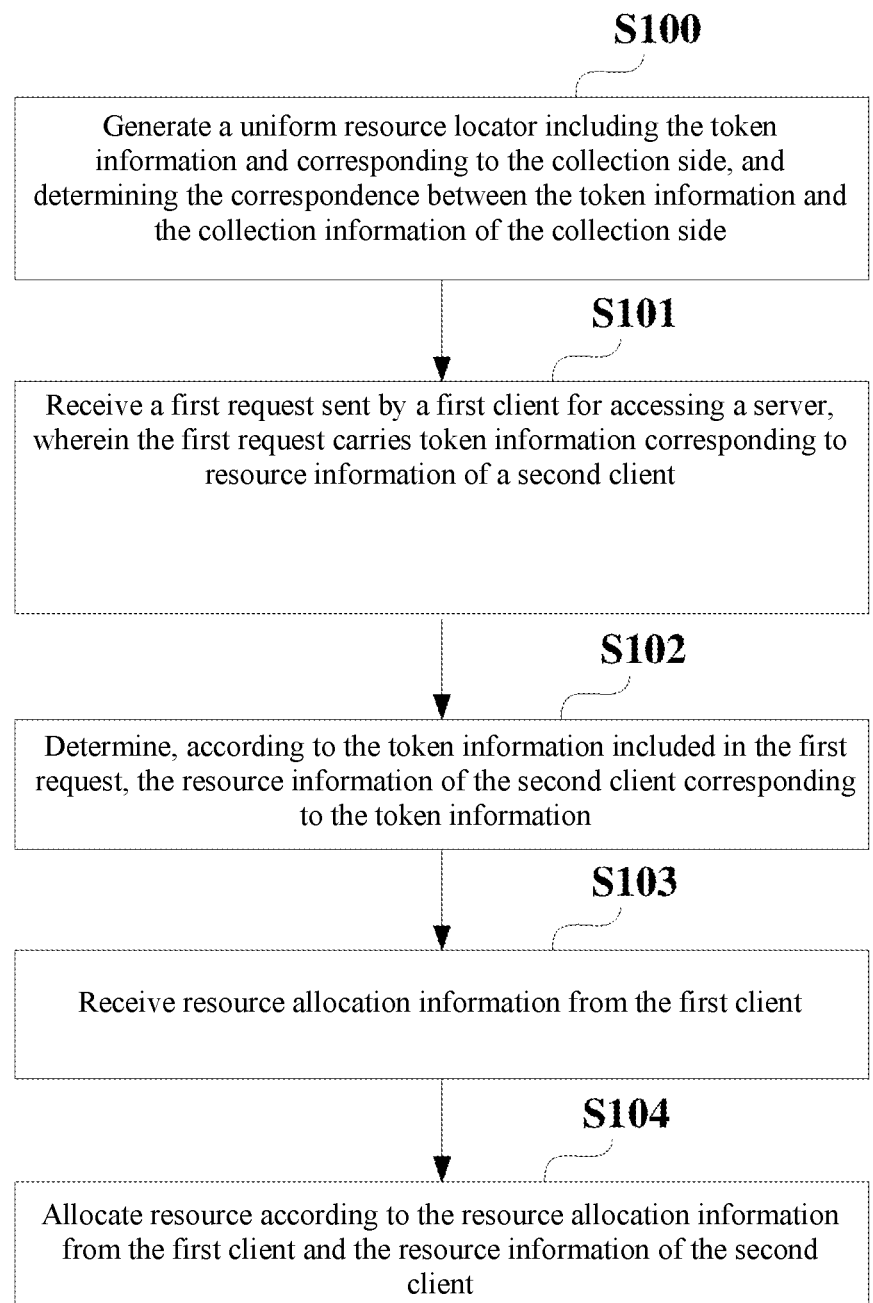
FIG. 1B is a flow chart of a second resource allocation method according to one embodiment of this application.
Figure 1C:
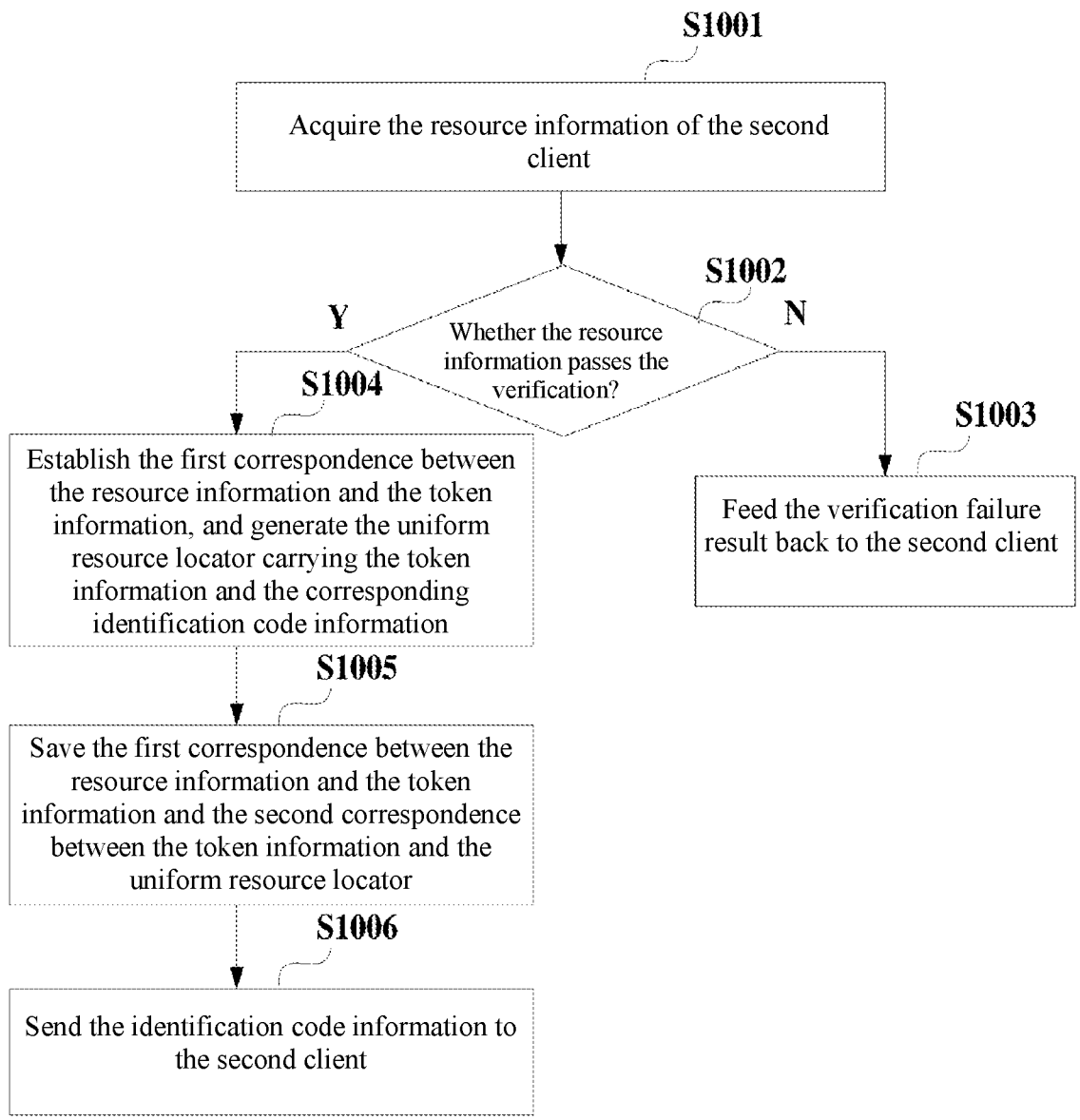
FIG. 1C is a flow chart of a third resource allocation method according to one embodiment of this application.

Before the server receives the first request at S101, the first client can scan the identification code information of the second client, which may be publicly released by the second client or directionally displayed to the first client. The identification code information can be obtained through mapping by the server according to the existing resource information of the second client, or can be determined by the server according to the resource information submitted by the second client upon a request of the second client, as shown in FIG. 1B. In some embodiments, the server may execute S100 to generate a uniform resource locator to include the token information and correspond to the collection party, and further establish the correspondence between the token information and the resource information of the second client. S101-S104 in FIG. 1B are the same as those in FIG. 1A. In some embodiments, the following operations may be included, as shown in FIG. 1C.

At S1001, the server acquires the resource information of the second client.

At S1002, the server verifies the resource information of the second client and determines whether the resource information of the second client passes the verification. If not (N at S1002), at S1003, the server sends a verification failure result back to the second client. If the resource information of the second client passes the verification (Y at S1002), S1004-S1006 are performed.

At S1004, the server establishes the first correspondence between the resource information and the token information when the resource information of the second client passes the verification, and generates a uniform resource locator to include the token information and the corresponding identification code information.

At S1005, the server stores the first correspondence between the resource information and the token information and a second correspondence between the token information and the uniform resource locator.

At S1006, the server sends the identification code information to the second client.

In performing S1001, the resource information of the second client may be obtained in a variety of ways, e.g., being read by the server from a database, or being submitted by the second client to the server. When S1002 is performed to verify the resource information of the second client, the verification content and verification process of the resource information may vary according to different resource information submitted to the server by the second client. For example, if the resource information submitted by the second client includes the name and bank account of a second client user, the server can verify the consistency and correspondence of relevant information such as name, bank account, and bank information. In some embodiments, if the server can verify the information (for example, the server includes a bank system server or stores the account information of a bank system), the server can provide a verification result. If the server cannot verify the information, the information needs to be sent to a competent authority (such as a central bank system) for verification. Whether the information passes the verification is determined according to a verification result obtained by a feedback process. For example, if the resource information submitted by the second client includes the member registration information of the second client on the platform server, such as registered member account, and account password, the server can verify the membership of the second client on the platform server and determine whether the information passes the verification according to the verification result. In some embodiments, if the resource information submitted by the second client includes the business plans applied by the second client and relevant qualification certificates (such as business license, and food hygiene license), the server can verify the correspondence between the subject qualification of the second client and the qualification certificates. The resource information submitted by the second client may also include a service type corresponding to the identification code information applied by the second client. The service type may indicate whether the second client will act as a resource transferor or a resource receiver in a resource allocation process, or may also indicate a type of industry the second client user is engaged in, such as catering industry, and clothing industry. The provided embodiments do not restrict by what means the second client submits the resource information, which resource information to submit, and the like, nor does it make specific restrictions on what processes and means the server uses to verify the resource information, which resource information to verify, and how to determine whether the resource information passes the verification, and the like, as long as the resource information corresponding to the second client saved by the server can meet the requirements for resource allocation when S104 is performed.

When the resource information is verified, the server executes the steps S1004-S1006 to establish the first correspondence between the resource information and the token information, generates the uniform resource locator to include the token information and the corresponding identification code information, and then sends the identification code information to the second client so that the second client can display the identification code information to the first client. In some embodiments, the identification code information may be a bar code or a two-dimensional code, or a combination of a bar code and a two-dimensional code. In some embodiments, a two-dimensional code with large amount of information, easy identification, strong fault tolerance, low cost, and high durability may be used. When the first client needs to allocate resources to the second client, the uniform resource locator corresponding to the identification code information can be identified when the identification code information is scanned, thereby making the first request for accessing the server, namely, a request for accessing an address corresponding to the uniform resource locator.

The uniform resource locator (URL) mentioned in the above embodiment is a concise representation of a location and an access method of a file available on the Internet, which is an access address of a standard file on the Internet. Each file on the Internet has a unique URL, and the information contained in a URL usually indicates the location of the file and how the file should be handled. In this embodiment, the server performs S1004 to establish the first correspondence between the resource information and the token information, and establish the second correspondence between the token information and the uniform resource locator, thereby mapping the resource information of the second client into a URL by means of a bridge function of the token information. When establishing the correspondences, the token information of the resource information of the second client is added to the URL. Therefore, after receiving the first request including the token information (i.e., the uniform resource locator URL in one-to-one correspondence with the identification code information for accessing the server) sent by the first client, the server can determine the second client and the resource information thereof corresponding to the URL through the token information included in the URL. The URL allows the server to determine the resource information of the second client corresponding to the token information in step S102, thus enabling the server to know which second client the first client wishes to allocate resources to, and retrieve the resource information of the second client to allocate resources. Further, the URL does not include the resource information of the second client. Therefore, after the first client scans the identification code information corresponding to the URL, the resource information such as name, bank account, and member account of the second client will not be identified, so that the privacy information of the second client is protected when the first client scans the identification code information.

To establish the correspondence between the token information and the resource information of the second client, in addition to the above method, a uniform resource locator including the token information can also be formed on the server. Then the correspondence between the token information and the resource information of the second client can be determined after the resource information of the second client is received. Similarly, the correspondence between the token information and the resource information can be established.

Figure 1D:
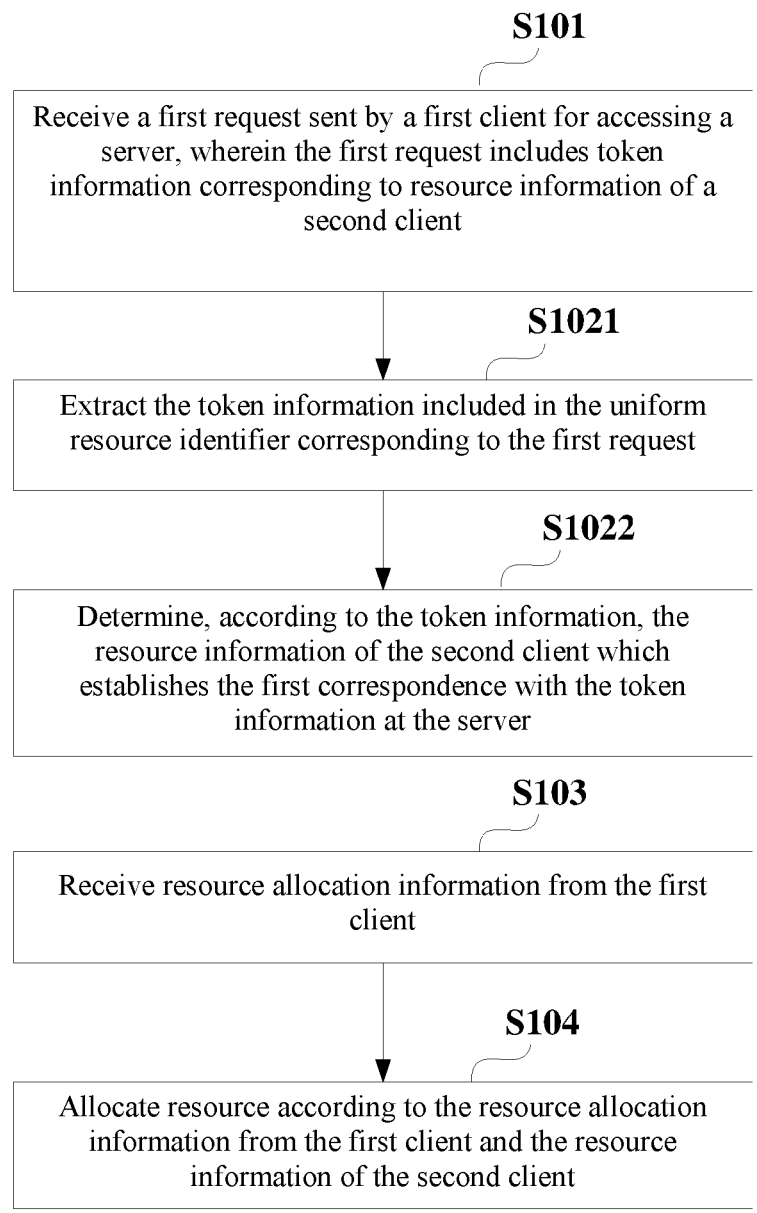
FIG. 1D is a flow chart of a fourth resource allocation method according to one embodiment of this application.

In some embodiments, when the server perform S102 to determine, according to the token information included in the first request, the resource information of the second client corresponding to the token information, as shown in FIG. 1D, the following steps may be included.

At S1021, the token information included in the uniform resource locator corresponding to the first request is extracted.

At S1022, according to the token information, the resource information of the second client which establishes the first correspondence with the token information at the server is determined.

In this embodiment, the token information included in the uniform resource locator can be understood as a bridge between the uniform resource locator and the resource information of the second client. In some embodiments, the uniform resource locator is not directly associated with the resource information of the second client, so that the first client cannot obtain the resource information of the second client through the uniform resource locator. Moreover, since the server stores the first correspondence between the resource information and the token information and the second correspondence between the token information and the uniform resource locator, the server can find the resource information which establishes a correspondence with the token information at the server through the token information included in the uniform resource locator. The server is able to determine the resource information corresponding to the uniform resource locator and realize resource allocation. In some embodiments, the token information having correspondence with the resource information of the second client and the token information included in the URL may be the same character string, or character strings which are combined and/or calculated according to a preset rule to obtain a preset conclusion.

Figure 1E:
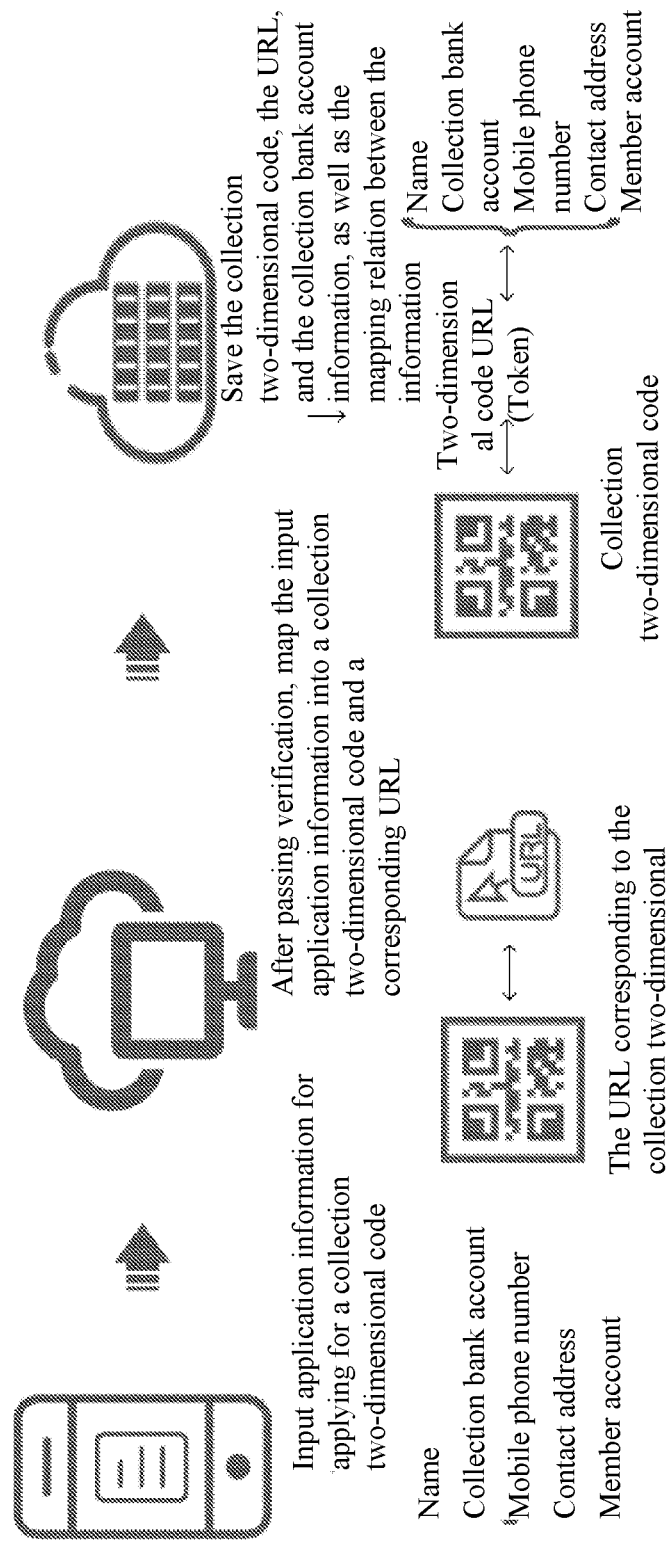
FIG. 1E is a schematic diagram of a fifth resource allocation method according to one embodiment of this application.

In the illustrated embodiments, the server generates the identification code information for the second client according to the resource information of the second client, and the server determines the resource information of the second client according to the first request sent by the first client after scanning the identification code information. The implementation of the above processes will be described in more detail below with reference to the embodiment shown in FIG. 1E.

A payee (equivalent to the second client) submits information such as name, payee bank account, mobile phone number, contact address, member account, and the like to the server as application information (equivalent to resource information) to apply for a collection two-dimensional code (equivalent to identification code information). After verifying the application information, the server maps the input application information into a collection two-dimensional code and a corresponding URL. The URL corresponding to the collection two-dimensional code contains a Token (equivalent to token information). The server then stores the collection two-dimensional code, the URL, and the collection bank account information, as well as the correspondence between the information. The correspondence includes that the collection two-dimensional code corresponds to the two-dimensional code URL containing the Token, and the Token contained in the two-dimensional code URL corresponds to the name, the collection bank account, the mobile phone number, the contact address, the member account, and other information of the payee. The two-dimensional code URL containing the Token is employed to shield the private information of the payee, thus protecting the privacy of the payee.

Figure 1F:
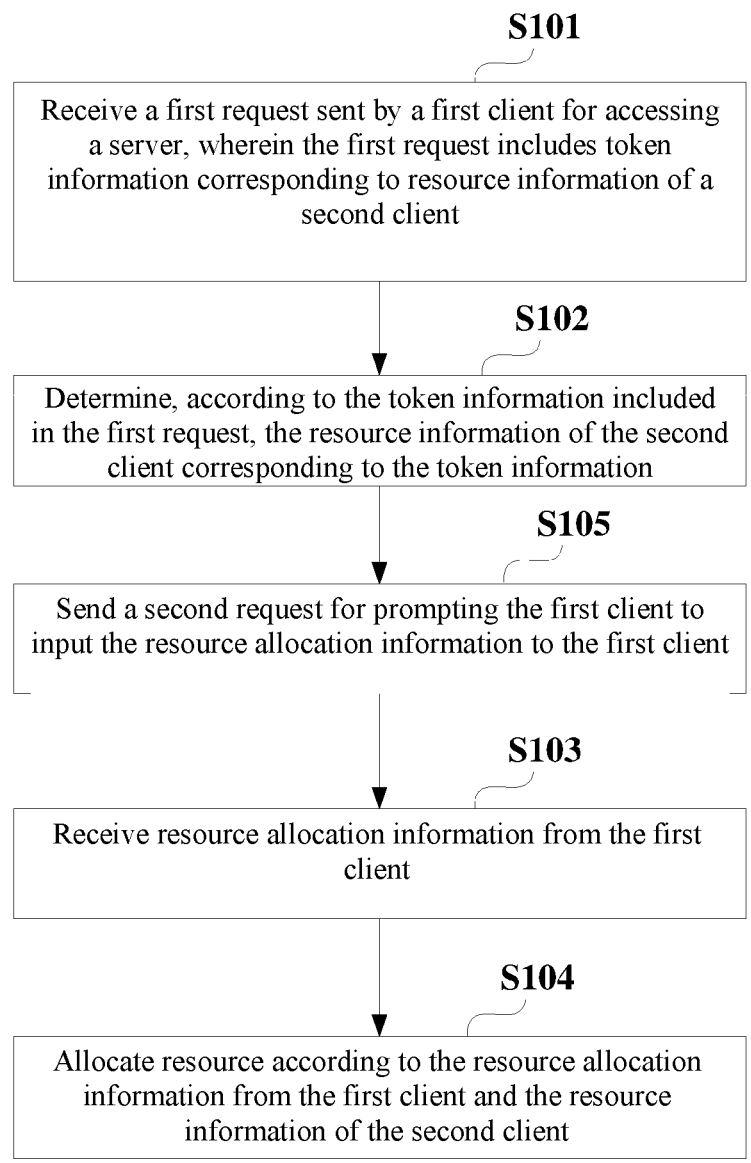
FIG. 1F is a flow chart of a sixth resource allocation method according to one embodiment of this application.

After the server receives the first request for accessing the server sent by the first client after scanning the identification code information of the second client in operation S101, and before receiving the resource allocation information from the first client in operation S103, as shown in FIG. 1F, the method may further include the following operations.

At S105, the server sends to the first client a second request for prompting the first client to input the resource allocation information.

After receiving the first request sent by the first client, the server may execute the operation S102 to determine the resource information of the corresponding second client, and on the other hand. In some embodiments, the server may wait to receive the resource allocation information sent by the first client, or perform S105 to actively send the second request to the first client to prompt the first client to input the resource allocation information. In this embodiment, the execution sequence of the operation S105 and the operation S102 is not particularly limited, and the two operations can be performed one after the other or simultaneously.

Further, in some embodiments, in the operation S105, the second request sent by the server to the first client does not contain the resource information of the second client that is obtained by analyzing the token information, so that the first client can be further prevented from knowing the privacy information of the second client. The privacy information in the resource allocation process can be securely protected.

Figure 1G:
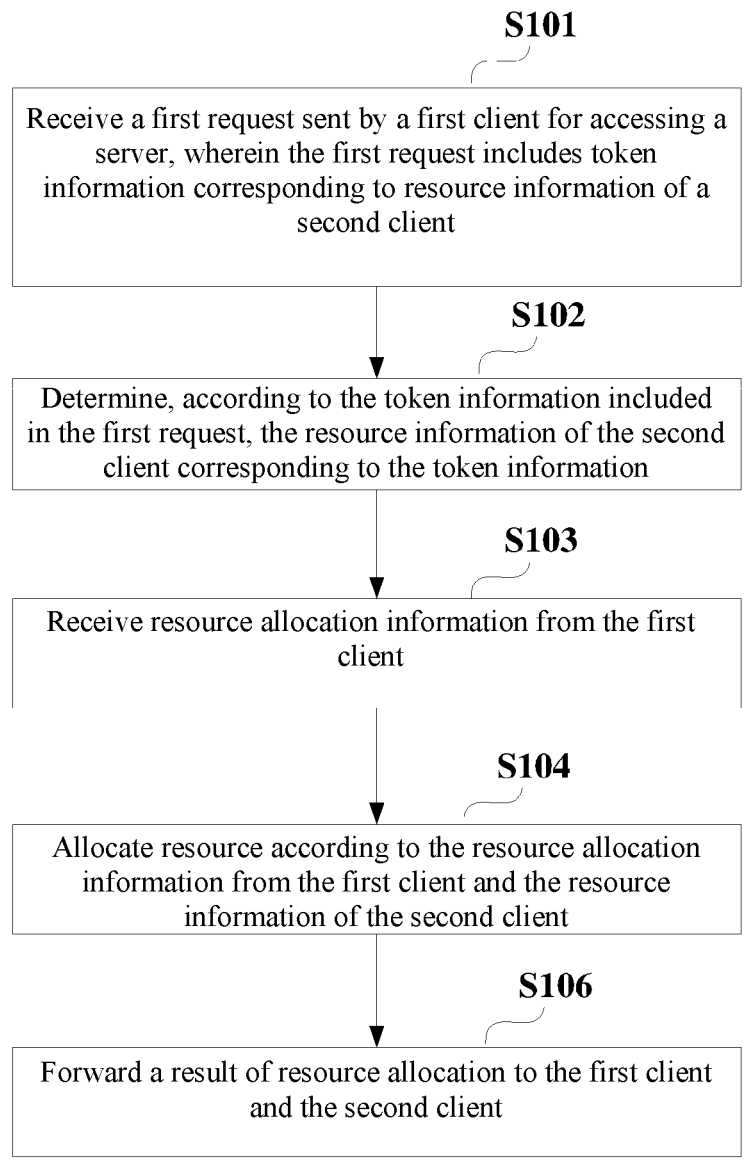
FIG. 1G is a flow chart of a seventh resource allocation method according to one embodiment of this application.

After executing the operation S104 to allocate resource according to the resource allocation information received from the first client and the resource information of the second client, as shown in FIG. 1G, the method may further include, at S106 the server forwards a result of resource allocation to the first client and the second client.

In some embodiments, when the result of resource allocation is forwarded to the first client and the second client, the result of resource allocation may include a result of successful resource allocation or a result of failed resource allocation, but does not include the resource information of the second client or the resource allocation information from the first client. Therefore, the privacy information of the first client and the second client is continuously protected after resource allocation is completed, such that the information of resource allocation is securely protected.

In various embodiments of this application, the resource allocation information from the first client may include the first resource management account information and the resource allocation data information of the first client. The resource allocation data information may include a quantify of the resources which are expected to be allocated, and may also include relevant descriptions such as the purpose of resource allocation, and user information. For example, in a bank fund transfer, the resource allocation data information can include an amount of fund to be transferred, and include remarks such as the purpose of the transfer. The first resource management account information received from the first client may be determined by a first client user according to the actual situation of the first client. For example, when the first client needs to make a transfer and if the first client user is not a registered user of the payment platform, the first resource management account information may be information such as the bank account, name, opening bank, and bank password used by the user for the transfer. If the first client user is a registered user of the payment platform, the first resource management account information may be the user name and password that the user has registered in the payment platform.

In various embodiments of this application, the resource information of the second client may include the identity information and the second resource management account information of the second client. The specific content may be selected and determined according to the actual situation of the second client. For example, the identity information of the second client may include one or more pieces of relevant information related to identity authentication of the second client, such as name, identity card number, mobile phone number, contact address, business registration information, and qualification authentication information. The second resource management account information may also contain a plurality of optional contents. For example, when the second client wants to receive a payment through transfer and the second client user is not a registered user of the payment platform, the second resource management account information may be information such as the bank account, name, and opening bank used by the user for the transfer. If the second client user is a registered user of the payment platform, the second resource management account information may also be the user name and password that the user has registered in the payment platform.

According to the embodiments of this application, if the first client and the second client wish to allocate resources, the server is provided with the information needed to allocate resources, that is, only the resources to be allocated and part of information, closely related to the allocated resources, of the resource transferor and the resource receiver need to be provided regardless whether the first client and the second client have registered as members on the platform and whether the first client and the second client are registered members on the same platform. In some embodiments, when funds are to be allocated, the first client and the second client may or may not be registered members of the payment platform, and may or may not be registered members on the same payment platform. If the first client or the second client is not a registered member of the payment platform, a bank account which can be used for the fund transfer is provided to the server. Therefore, in some embodiments, the first resource management account information stored at the server may not contain the user registration information of the first client, and/or the second resource management account information stored at the server may not contain the user registration information of the second client, thus simplifying the operation of member registration of the first client and/or the second client at the server before resource allocation. Whether the first client user and the second client user are registered members on the same platform is not particularly required, which is beneficial to improving the applicability of the embodiments of this application.

In some embodiments, the server may be operated by independent operators or by different operators. For example, a platform server and at least one resource manager may be included. For example, in FIG. 1A, the platform server executes the operations S101-S103 and the resource manager executes the operation S104. In the embodiment shown in FIG. 1B and FIG. 1C, the operation S100 and the operations S1001-S1006 are executed by the platform server. In the embodiment shown in FIG. 1F, the operation S105 is executed by the platform server. In the embodiment shown in FIG. 1G, the operation 106 may be executed by the platform server, or by the resource manager, or by a combination of the two.

Further, if there are multiple optional resource managers, assuming that the first client is the resource transferor and the second client is the resource receiver, a matched resource manager may be determined according to the resource transferor (the first client). In some embodiments, after the platform server receives the resource allocation information from the first client, and before the resource manager completes resource allocation according to the resource allocation information received from the first client and the resource information of the second client, the method may further include the following operations.

The platform server determines, according to first resource management account information received from the first client, the resource manager corresponding to the first resource management account information. The platform server sends a resource allocation instruction to the resource manager corresponding to the first resource management account information for the resource manager corresponding to the first resource management account information to complete resource allocation.

Based on the above example, since the resource allocation information received from the first client is stored in the platform server and the resource information of the second client is also stored in the platform server, in order to realize resource allocation by the resource manager, the second resource management account information of the second client and the resource allocation data information received from the first client can be added to the resource allocation instruction sent by the platform server to the resource manager corresponding to the first resource management account information.

The first client in the embodiments may be a resource transferor or a resource receiver, as long as the first client and the second client are opposite parties of resource allocation. For example, in a fund transfer, a payer (the first client) scans identification code information (can be embodied as two-dimensional code) corresponding to a payee (the second client) to make a payment. Or the payee (the first client) scans identification code information (can be embodied as two-dimensional code) corresponding to the payer (the second client) to make a collection. In practical applications, if the payer is the first client and the payee is the second client, the fund safety of the payer can be better guaranteed, and the frequent collection of the payee can also be ensured with high efficiency. The method can be used by a merchant to collect money from customers, and can also be used in situations where individuals need to transfer money. In practical applications, if the payer is the second client and the payee is the first client, the fund security of the payer can be protected by combining with other technical or non-technical means. The method can be used by a tax department (the first client, as the payee) to collect taxes from individuals or enterprises (the second client, as the payer), or by a social security department (the first client, as the payee) to deduct money from individuals or enterprises (the second client, as the payer).

Embodiment 2

Referring to FIG. 2, the present specification further provides a resource allocation method applicable to a first client including the following operations.

At S201, the first client sends a first request to a server for accessing the server so that the server determines, according to token information included in the first request, resource information of a second client corresponding to the token information. The first request includes the token information corresponding to the resource information of the second client.

At S202, resource allocation information is received and sent to the server for the server to complete resource allocation according to the resource allocation information received from the first client and the resource information of the second client.

The first client in the above embodiment can scan identification code information using equipment with a scanning function, or by using an smart mobile terminal equipped with an Application (APP) to send the first request.

Further, after sending the first request for accessing the server to the server, and before inputting the resource allocation information, the method may further include receiving a second request sent by the server for prompting the first client to input the resource allocation information.

The first client in this embodiment cooperates with the server in Embodiment 1 to realize the technical purpose of this application. The relevant explanations in Embodiment 1 are applicable to this embodiment and will not be repeated here.

Embodiment 3

The present specification further provides a resource allocation method applicable to a second client. After receiving identification code information, the second client displays the identification code information to a first client so that a server can perform the following operations. The server receives a first request sent by the first client for accessing the server. The first request includes token information corresponding to resource information of the second client. The server determines, according to the token information included in the first request, the resource information of the second client corresponding to the token information, and receives resource allocation information from the first client. The server allocates resource according to the resource allocation information input by the first client and the resource information of the second client.

In some embodiments, the second client can submit the resource information for applying for the identification code information to the server, so that the server establishes a first correspondence between the resource information and the token information when the resource information passes the verification, generates a uniform resource locator to include the token information and the corresponding identification code information, and saves the first correspondence between the resource information and the token information and a second correspondence between the token information and the uniform resource locator. After the server sends the identification code information to the second client, the second client can display the identification code information to the first client.

In some embodiments, the resource information can be submitted to the server in a form of an offline paper material, or on a web page corresponding to the server, or by an app of a mobile terminal.

Figure 3B:
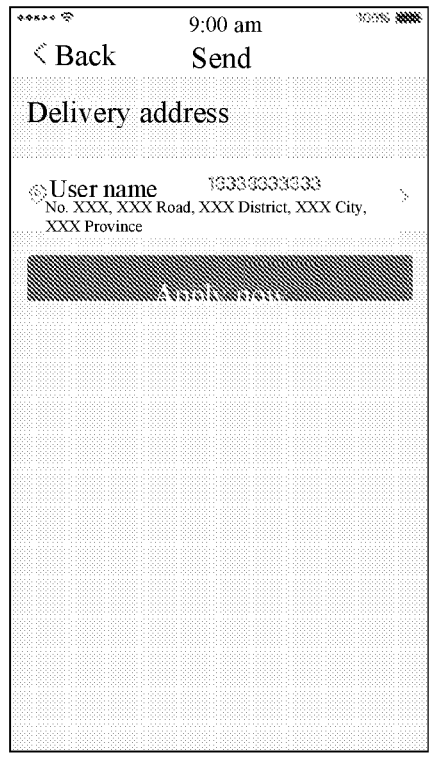
FIG. 3B is a schematic diagram of a second interface of a resource allocation method according to one embodiment of this application.
Figure 3C:
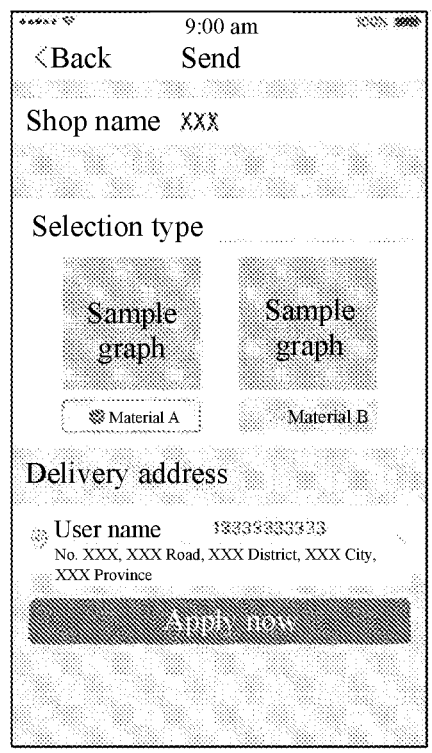
FIG. 3C is a schematic diagram of a third interface of a resource allocation method according to one embodiment of this application.

FIG. 3A to FIG. 3C show an embodiment of the second client applying for the two-dimensional code to the server, where the second client is a payee. The second client applies to the server for issuing a collection two-dimensional code. FIG. 3A shows an interface for applying for a collection two-dimensional code, including: resource information that the server requires the second client (the payee) to fill in. The resource information may include at least one user unique identifier, such as mobile phone number or bank card number. As shown in FIG. 3A, the resource information may contain three user unique identifiers, specifically, the mobile phone number "13333333333" input by the user, the name of a cardholder "XXX", and the bank card number "6666666666666666", and may also contain a verification code obtained in real time according to the mobile phone number.

After the "next step" operation is initiated in the interface of FIG. 3A, the above information is submitted to the server so that the server can verify the resource information. After verification is successful, the resource information is mapped to correspond to the collection two-dimensional code and a corresponding URL (the URL includes token information for determining the resource information). Further, the server issues the collection two-dimensional code to the second client, which can be achieved in a variety of ways, such as sending the collection two-dimensional code to the second client in an electronic form. In some embodiments, as shown in FIG. 3B or FIG. 3C, the server may require the second client to provide a delivery address for the collection two-dimensional code or the server displays the obtained delivery address to the second client for confirmation, so that the server can send the collection two-dimensional code to the second client after printing.

After receiving the collection two-dimensional code, the second client can display the collection two-dimensional code to a first client, so that the first client can scan the collection two-dimensional code and make a transfer.

The second client in this embodiment cooperates with the server in Embodiment 1 to realize the technical purpose of this application. The relevant explanations in Embodiment 1 are applicable to this embodiment and will not be repeated here.

Embodiment 4

Figure 4:
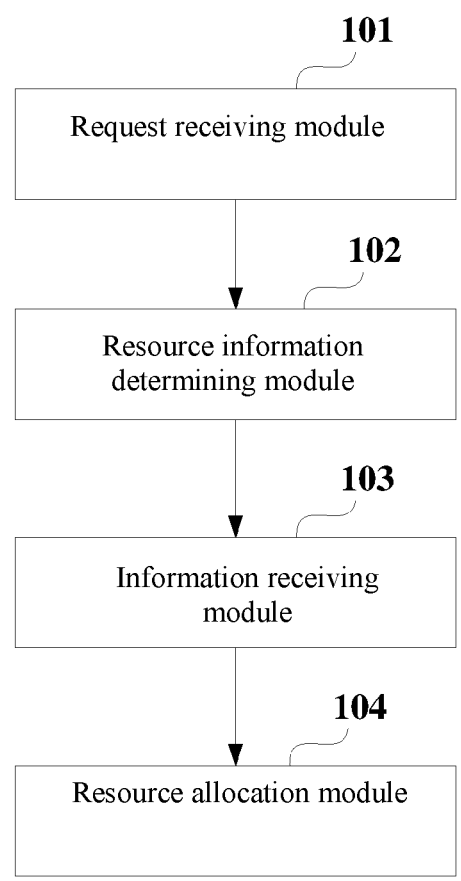
FIG. 4 is a structural diagram of a resource allocation device according to one embodiment of this application.

Referring to FIG. 4, corresponding to the resource allocation method provided in Embodiment 1, the present specification further provides a resource allocation device, including: a request receiving module 101, a resource information determining module 102, an information receiving module 103, and a resource allocation module 104.

The request receiving module 101 is configured to receive a first request sent by a first client for accessing a server. The first request includes token information corresponding to resource information of a second client.

The resource information determining module 102 is configured to determine, according to the token information included in the first request, the resource information of the second client corresponding to the token information.

The information receiving module 103 is configured to receive resource allocation information from the first client; and The resource allocation module 104 is configured to complete resource allocation according to the resource allocation information received from the first client and the resource information of the second client.

This embodiment can also be understood as an implementation solution of the server. When the server is divided into a platform server and a resource manager, the request receiving module 101, the resource information determining module 102, and the information receiving module 103 can be considered as part of the platform server, and the resource allocation module 104 can be considered as part of the resource manager.

Since this embodiment corresponds to the resource management method in Embodiment 1, the relevant explanations in Embodiment 1 are applicable to this embodiment and will not be repeated here.

Embodiment 5

This application further provides an electronic payment method when the method of Embodiment 1 is applied to the financial field. That is, the resource is embodied as funds, the allocation method is embodied as electronic payment, and the first client and the second client are embodied as opposite parties of an electronic payment. when the first client corresponds to a payment party, the second client corresponds to a collection party, the resource information corresponds to collection information, and the resource allocation information corresponds to payment information, the electronic payment method may include the following operations.

A first request sent by the payment party for accessing a server is received. The first request includes token information corresponding to collection information of the collection party. According to the token information included in the first request, the collection information of the collection party corresponding to the token information is determined. Payment information from the payment party is received, and electronic payment from the payment party to the collection party is performed according to the payment information received from the payment party and the collection information of the collection party.

In the above embodiment, the first request for accessing the server sent by the payment party may be sent by the payment party after obtaining, by e.g., scanning, identification code information of the collection party, or may be sent by the payment party after obtaining a designated web address or a designated character string. Further, the identification code information may be a bar code or two-dimensional code, thus simplifying the operation of electronic payment and improving efficiency.

The first request may include a uniform resource locator for accessing the server, and the uniform resource locator includes token information for determining the collection information of the collection party.

In some embodiments, establishing the correspondence between the token information and the collection information of the collection party may include: generating a uniform resource locator to include the token information and corresponding to the collection party, and determining the correspondence between the token information and the collection information of the collection party.

In some embodiments, the correspondence between the token information and the collection information of the collection party may be established by: acquiring the collection information of the collection party; establishing a first correspondence between the collection information and the token information when the collection information passes verification, and generating the uniform resource locator to include the token information and corresponding identification code information; and saving the first correspondence between the collection information and the token information and a second correspondence between the token information and the uniform resource locator, and sending the identification code information to the collection party.

Thus, the uniform resource locator is generated and the correspondence between the token information and the collection information is established after the collection information of the collection party is obtained. In some embodiments, the content of the token information may be related to the content of the collection information.

The correspondence between the token information and the collection information may also be established by: generating the uniform resource locator including the token information and the corresponding identification code information; and after receiving the collection information of the collection party, establishing the correspondence between the token information and the collection information of the collection party.

By establishing the correspondence in this way, the uniform resource locator including the token information may be generated in advance at the server. After the server receives the collection information of the collection party, the collection information may be further verified. After the collection information is verified, the correspondence between the collection information and the pre-generated uniform resource locator including the token information may be established, thus establishing the correspondence between the token information and the collection information of the collection party. In this way, the contents of the token information and the uniform resource locator are not related to the collection information of the collection party, but only the correspondence between the token information and the collection information is established at the server.

In some embodiments, the server determines, according to the token information included in the first request, the collection information of the collection party corresponding to the token information by: extracting the token information included in the uniform resource locator corresponding to the first request; and determining, according to the token information, the collection information of the collection party which establishes the first correspondence with the token information at the server.

The payment information received from the payment party may include payment account information of the payment party and electronic payment amount information. The collection information of the collection party may include identity information and collection account information of the collection party. Further, the payment account information may include bank account information of the payment party and/or user registration account information of the payment party at the server. The collection account information may include bank account information of the collection party and/or user registration account information of the collection party at the server. If the server has already obtained the payment account information of the payment party before making the electronic payment, the payment information received from the payment party when the electronic payment is made may only include the electronic payment amount information corresponding to this electronic payment.

Further, the server may include a platform server and at least one financial server, and the electronic payment method may include the following operations. The platform server receives the first request sent by the payment party for accessing the platform server. The first request includes token information corresponding to the collection information of the collection party. The platform server determines, according to the token information included in the first request, the collection information of the collection party corresponding to the token information. The platform server receives the payment information from the payment party. The financial server completes electronic payment from the payment party to the collection party according to the payment information received from the payment party and the collection information of the collection party.

Further, after the platform server receives the payment information from the payment party, and before the financial server completes electronic payment from the payment party to the collection party according to the payment information received from the payment party and the collection information of the collection party, the following operations may be performed.

The platform server determines, according to the payment account information of the payment party, a financial server corresponding to the payment account information. The platform server sends a payment instruction to the financial server corresponding to the payment account information for the financial server corresponding to the payment account information to complete electronic payment from the payment party to the collection party. The payment instruction sent by the platform server to the financial server corresponding to the payment account information may contain collection account information of the collection party and the payment account information of the payment party.

In some embodiments, when the first client corresponds to a collection party, the second client corresponds to a payment party, the resource information corresponds to payment information, and the resource allocation information corresponds to collection information, the electronic payment method may include the following operations.

A first request for accessing a server sent by the collection party is received after scanning identification code information of the payment party. The first request includes token information corresponding to the payment information of the payment party.

According to the token information included in the first request, the payment information of the payment party corresponding to the identification code information is determined.

The collection information from the collection party is received, and an electronic payment from the payment party to the collection party is performed according to the collection information received from the collection party and the payment information of the payment party.

The electronic payment method of the above embodiment is the implementation of Embodiment 1 in a form of fund transfer and electronic payment. The relevant contents set forth in Embodiment 1 are applicable to this embodiment and will not be described here again.

The resource allocation method and device provided in the embodiments of this application are applicable to other situations requiring resource allocation between a first client and a second client in addition to the scenario of this embodiment. This embodiment should not be construed as limiting the application scenario of Embodiment 1.

Embodiment 6

A process of an electronic payment is explained with continued reference to the embodiments in Embodiments 1-5. The first client corresponds to the payment party and the second client corresponds to the collection party. In the electronic payment, a payment party, a collection party, a platform server, and a financial server cooperate with each other to realize the electronic payment.

Figure 5:
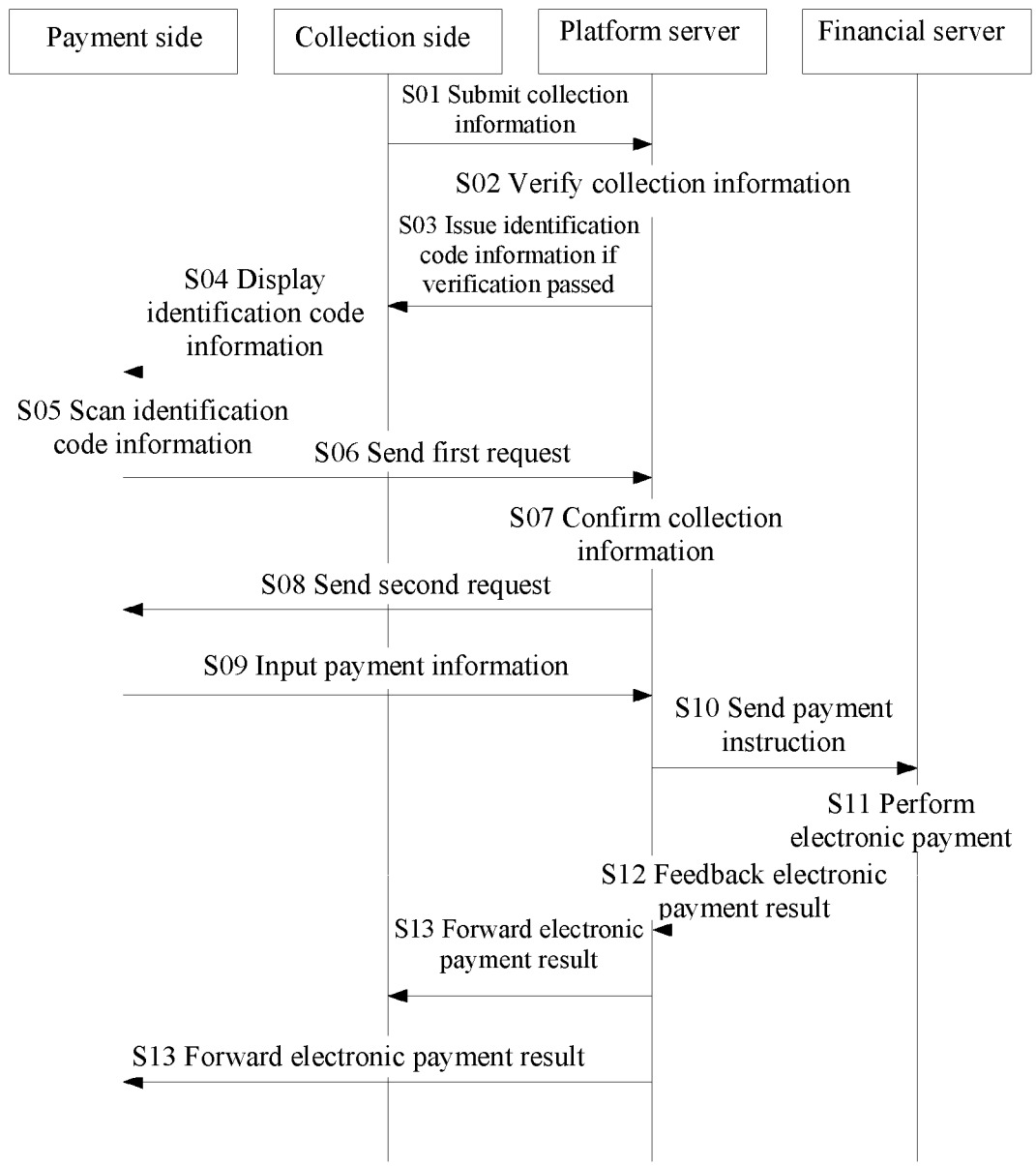
FIG. 5 is a flow chart of an electronic payment method according to one embodiment of this application.

Reference is now made to FIG. 5.

At S01, the collection party submits collection information to the platform server.

At S02, the platform server verifies the collection information submitted by the collection party.

At S03, after the collection information is verified, the platform server sends identification code information to the collection party. The identification code information may be a bar code or a two-dimensional code. The identification code information can be sent in a form of an electronic identification code for the collection party to download, print, and display, or can be printed by the server and then sent to the collection party in a form of a paper identification code.

At S04, after receiving the identification code information, the collection party displays the identification code information to the paying party.

At S05, the payment party scans the identification code information.

At S06, the payment party sends a first request to the platform server. The first request includes token information, and the first request does not include collection information of the collection party.

At S07, the platform server determines, according to the token information included in the first request, the collection information of the corresponding collection party.

At S08, the platform server sends a second request to the payment party for prompting the payment party to input payment information.

At S09, the payment party inputs payment information and sends the payment information to the platform server.

At S10, the platform server sends a resource allocation instruction to the financial server, which includes payment information input by the payment party and collection information of the collection party.

At S11, the financial server performs electronic payment according to the payment information and the collection information.

At S12, the financial server feeds back an electronic payment result to the platform server.

At S13, the platform server pushes the electronic payment result to the payment party and the collection party.

For matters not covered in this embodiment, please refer to relevant explanations in Embodiments 1-5, which will not be repeated here.

A person skilled in the art should understand that the embodiments may be provided as a method, a system, or a computer program product. Therefore, the embodiments may be in a form of complete hardware embodiments, complete software embodiments, or embodiments combining software and hardware. Moreover, the embodiments may use a form of a computer program product that is implemented on one or more computer-usable storage media (including but not limited to a disk memory, a CD-ROM, an optical memory, and the like) that include computer-usable program code.

The embodiments are described with reference to the flowcharts and/or block diagrams of the method, the device (system), and the computer program product. It should be understood that computer program instructions may be used for implementing each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more processes in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more processes in the flowcharts and/or one or more blocks in the block diagrams.

In a typical configuration, the computer device includes one or more processors (CPUs), an input/output interface, a network interface, and a memory.

The memory may include, among computer readable media, a non-persistent memory such as a random access memory (RAM) and/or a non-volatile memory such as a read-only memory (ROM) or a flash memory (flash RAM). The memory is an example of the computer-readable medium.

The computer-readable medium includes persistent, non-persistent, movable, and unmovable media that may implement information storage by using any method or technology. Information may be a computer-readable instruction, a data structure, a program module, or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present specification, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase ¡° include one ¡-¡-¡± does not exclude other same elements in the process, method, article or device which include the element.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

The foregoing descriptions are merely embodiments of this application and are not intended to limit this application. For a person skilled in the art, various modifications and variations can be made to this application. Any modification, equivalent replacement, or improvement made without departing from the spirit and principle of this application shall fall within the scope of the claims of this application.

What is claimed is:

1. A resource allocation method, comprising:
   acquiring, by a server, account information of a second client operated by a merchant;
   establishing, by the server, a first correspondence between the account information and token information when the account information is verified as meeting one or more requirements for resource allocation;
   generating, by the server, (i) a uniform resource locator carrying the token information and (ii) a bar code or a two-dimensional code corresponding to the uniform resource locator;
   saving, by the server, the first correspondence between the account information and the token information and a second correspondence between the token information and the uniform resource locator;
   sending, by the server, the bar code or the two-dimensional code to the second client to enable the second client to display the bar code or the two-dimensional code to a first client operated by a customer;
   receiving, by the server, a first request from the first client for accessing the server, wherein the first request includes the uniform resource locator and is generated by the first client after the first client scans the bar code or the two-dimensional code to extract the uniform resource locator from the bar code or the two-dimensional code;
   in response to receiving the first request sent by the first client, determining, by the server, the token information carried in the uniform resource locator based on the second correspondence;
   in response to successfully determining the token information based on the second correspondence, determining, by the server according to the token information, the account information of the second client based on the first correspondence;
   receiving, by the server, resource allocation information from the first client; and
   allocating, by the server, resource according to the resource allocation information from the first client and the account information of the second client.

2. The method according to claim 1, wherein determining, by the server according to the token information, the account information of the second client based on the first correspondence comprises:

extracting the token information included in the uniform resource locator corresponding to the first request; and
determining, according to the token information, the account information of the second client based on the first correspondence.

3. The method according to claim 1, wherein after receiving the first request from the first client for accessing the server, and before receiving the resource allocation information from the first client, the method further comprises:
sending a second request for prompting the first client to input the resource allocation information to the first client.

4. The method according to claim 1, wherein after allocating the resource according to the resource allocation information from the first client and the account information of the second client, the method further comprises:
forwarding a result of resource allocation success or failure to the first client and the second client.

5. The method according to claim 1, wherein the first request does not contain the account information of the second client.

6. An apparatus comprising:
a processor; and
a memory coupled to the processor and configured with instructions executable by the processor, wherein the processor is configured to execute the instructions to perform operations including:
acquiring account information of a second client operated by a merchant;
establishing a first correspondence between the account information and token information when the account information is verified as meeting one or more requirements for resource allocation;
generating (i) a uniform resource locator carrying the token information and (ii) a bar code or a two-dimensional code corresponding to the uniform resource locator;
saving the first correspondence between the account information and the token information and a second correspondence between the token information and the uniform resource locator;
sending the bar code or the two-dimensional code to the second client to enable the second client to display the bar code or the two-dimensional code to a first client operated by a customer;
receiving a first request from the first client for accessing the server, wherein the first request includes the uniform resource locator and is generated by the first client after the first client scans the bar code or the two-dimensional code to extract the uniform resource locator from the bar code or the two-dimensional code;
in response to receiving the first request sent by the first client, determining the token information carried in the uniform resource locator based on the second correspondence;
in response to successfully determining the token information based on the second correspondence, determining, according to the token information, the account information of the second client based on the first correspondence;
receiving resource allocation information from the first client; and
allocating resource according to the resource allocation information from the first client and the account information of the second client.

7. The apparatus according to claim 6, wherein determining, according to the token information, the account information of the second client based on the first correspondence comprises:
extracting the token information included in the uniform resource locator corresponding to the first request; and
determining, according to the token information, the account information of the second client based on the first correspondence.

8. The apparatus according to claim 6, wherein after receiving the first request from the first client for accessing the server, and before receiving the resource allocation information from the first client, the operations further comprise:
sending a second request for prompting the first client to input the resource allocation information to the first client.

9. The apparatus according to claim 6, wherein after allocating the resource according to the resource allocation information from the first client and the account information of the second client, the operations further comprise:
forwarding a result of resource allocation success or failure to the first client and the second client.

10. The apparatus according to claim 6, wherein the first request does not contain the account information of the second client.

11. One or more non-transitory computer-readable storage media storing instructions which, when executed by one or more processors, cause the one or more processors to perform operations including:
acquiring account information of a second client operated by a merchant;
establishing a first correspondence between the account information and token information when the account information is verified as meeting one or more requirements for resource allocation;
generating (i) a uniform resource locator carrying the token information and (ii) a bar code or a two-dimensional code corresponding to the uniform resource locator;
saving the first correspondence between the account information and the token information and a second correspondence between the token information and the uniform resource locator;
sending the bar code or the two-dimensional code to the second client to enable the second client to display the bar code or the two-dimensional code to a first client operated by a customer;
receiving a first request from the first client for accessing the server, wherein the first request includes the uniform resource locator and is generated by the first client after the first client scans the bar code or the two-dimensional code to extract the uniform resource locator from the bar code or the two-dimensional code;
in response to receiving the first request sent by the first client, determining the token information carried in the uniform resource locator based on the second correspondence;
in response to successfully determining the token information based on the second correspondence, determining, according to the token information, the account information of the second client based on the first correspondence;
receiving resource allocation information from the first client; and allocating resource according to the resource allocation information from the first client and the account information of the second client.

12. The one or more non-transitory computer-readable storage media according to claim 11, wherein determining, according to the token information, the account information of the second client based on the first correspondence comprises:
   extracting the token information included in the uniform resource locator corresponding to the first request; and
   determining, according to the token information, the account information of the second client based on the first correspondence.

13. The one or more non-transitory computer-readable storage media according to claim 11, wherein after receiving the first request from the first client for accessing the server, and before receiving the resource allocation information from the first client, the operations further comprise:
   sending a second request for prompting the first client to input the resource allocation information to the first client.

14. The one or more non-transitory computer-readable storage media according to claim 11, wherein after allocating the resource according to the resource allocation information from the first client and the account information of the second client, the operations further comprise:
   forwarding a result of resource allocation success or failure to the first client and the second client.

15. The one or more non-transitory computer-readable storage media according to claim 11, wherein the first request does not contain the account information of the second client.

* * * * *